US010536602B2

(12) United States Patent
Onsen

(10) Patent No.: US 10,536,602 B2
(45) Date of Patent: Jan. 14, 2020

(54) DEVICE, SOFTWARE INSTALLATION METHOD, AND STORAGE MEDIUM

(71) Applicant: CANON KABUSHIKI KAISHA, Tokyo (JP)

(72) Inventor: Takahiro Onsen, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/833,217

(22) Filed: Dec. 6, 2017

(65) Prior Publication Data

US 2018/0097958 A1    Apr. 5, 2018

Related U.S. Application Data

(63) Continuation of application No. 14/164,602, filed on Jan. 27, 2014.

(30) Foreign Application Priority Data

Feb. 18, 2013  (JP) .................................. 2013-028547

(51) Int. Cl.
   *H04N 1/00*  (2006.01)
(52) U.S. Cl.
   CPC ....... *H04N 1/00938* (2013.01); *H04N 1/0097* (2013.01); *H04N 1/00278* (2013.01);
   (Continued)
(58) Field of Classification Search
   CPC combination set(s) only.
   See application file for complete search history.

(56) References Cited

U.S. PATENT DOCUMENTS

2005/0231747 A1   10/2005  Bledsoe et al.
2006/0052919 A1*   3/2006  Hong ..................... G07C 5/008
                                                      701/31.4
(Continued)

FOREIGN PATENT DOCUMENTS

CN         102214148 A        10/2011
CN         102270129 A        12/2011
(Continued)

OTHER PUBLICATIONS

Chinese office action issued in corresponding application No. 2014100527363 dated Sep. 12, 2016.
(Continued)

*Primary Examiner* — Helen Zong
(74) *Attorney, Agent, or Firm* — Carter, DeLuca & Farrell LLP

(57)   ABSTRACT

Provided is an image forming device which is capable of connecting an external storage device. After the external storage device has been connected to the image forming device, the image forming device performs a software installation based on setting data acquired from the external storage device. The image forming device stores a script for executing steps required for the executed software installation in ordered sequence in the external storage device. When the script has already been stored in the external storage device upon connection of the external storage device to the image forming device, the image forming device performs the software installation by implementing the steps in the ordered sequence in accordance with the script.

8 Claims, 11 Drawing Sheets

(52) U.S. Cl.
CPC ..... *H04N 1/00965* (2013.01); *H04N 1/00973* (2013.01); *H04N 2201/0094* (2013.01)

(56) References Cited

U.S. PATENT DOCUMENTS

| | | | |
|---|---|---|---|
| 2007/0011289 A1* | 1/2007 | Goto | H04N 1/00244 709/223 |
| 2007/0203969 A1 | 8/2007 | Wakasa et al. | |
| 2008/0123135 A1 | 5/2008 | Inoue | |
| 2009/0080721 A1 | 3/2009 | Yan et al. | |
| 2010/0211943 A1 | 8/2010 | Chu et al. | |
| 2010/0245874 A1 | 9/2010 | Holub | |
| 2010/0257521 A1 | 10/2010 | Navarro | |
| 2010/0321718 A1 | 12/2010 | Mihira | |
| 2011/0004874 A1 | 1/2011 | Nakashima | |
| 2011/0255133 A1 | 10/2011 | Pastor et al. | |
| 2011/0304883 A1 | 12/2011 | Sugiyama | |
| 2012/0017286 A1* | 1/2012 | Ogura | H04N 1/00222 726/28 |
| 2012/0127507 A1 | 5/2012 | Young et al. | |
| 2012/0274964 A1 | 11/2012 | Kimura | |
| 2013/0038888 A1 | 2/2013 | Leeuwen et al. | |
| 2013/0074060 A1 | 3/2013 | Kim et al. | |
| 2013/0086572 A1 | 4/2013 | Iriumi | |
| 2013/0111564 A1* | 5/2013 | Jin | H04N 1/4413 726/4 |
| 2013/0148144 A1 | 6/2013 | Tao | |
| 2013/0310631 A1 | 11/2013 | Lee et al. | |

FOREIGN PATENT DOCUMENTS

| | | |
|---|---|---|
| CN | 102785489 A | 11/2012 |
| JP | 2005-078466 A | 3/2005 |
| JP | 2005-234817 A | 9/2005 |
| JP | 2011-180772 A | 9/2011 |

OTHER PUBLICATIONS

Japanese Office Action issued in corresponding application No. 2013028547 dated Jan. 10, 2017.

* cited by examiner

FIG. 4

| Machine body identifier | Machine body identifier of image forming device which has created script | 401 |
|---|---|---|
| Machine body model name | Model name of image forming device which has created script | 402 |
| Installation operation information | Work sequential order, work number, work data, and storage location | 403 |

FIG. 5

| State change (501) | Installation operation (502) | Work number (503) |
|---|---|---|
| Change in version of firmware | Installation of firmware | 01 |
| Change in the number of enabled additional options | Enablement of additional option | 02 |
| Change in setting information | Change in setting information | 03 |
| Change in the number of extension softwares | Installation of extension software | 04 |
| Change in version of extension software | Installation of extension software | 04 |
| Reinstallation + initial activation of setting software | Initialization of hard disk | 98 |
| Automatic activation of setting software | Reactivation of image forming device | 99 |

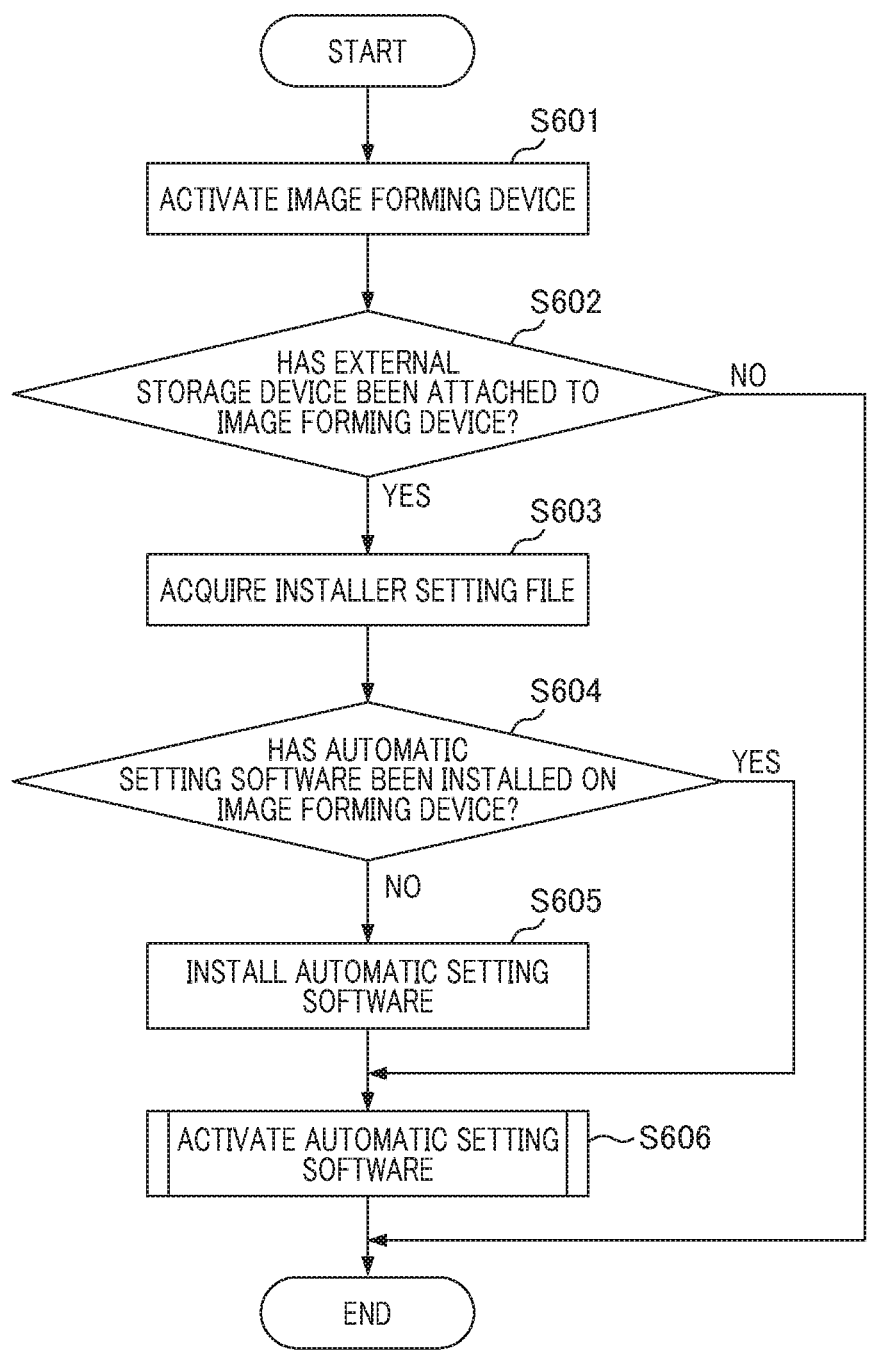

FIG. 9

| | | |
|---|---|---|
| Machine body identifier | AAA0001 | 801 |
| Machine body model name | XYZ001 | 802 |
| Installation operation information | Work sequential order: 1<br>Work number: 98 (Initialization of hard disk)<br>Work data: NULL | 803 |
| | Work sequential order: 2<br>Work number: 01 (Installation of firmware)<br>Work data: XYZ001-002<br>Storage location: USB¥data¥firmware | 804 |
| | Work sequential order: 3<br>Work number: 99 (Reactivation of image forming device)<br>Work data: NULL | 805 |
| | Work sequential order: 4<br>Work number: 02 (Enablement of additional option)<br>Work data: Additional option A, License A<br>Storage location: USB¥data¥additional option | 806 |
| | Work sequential order: 5<br>Work number: 03 (Change in setting information)<br>Work data: Setting information W<br>Storage location: USB¥data¥setting information | 807 |
| | Work sequential order: 6<br>Work number: 03 (Change in setting information)<br>Work data: Setting value X level 10 | 808 |
| | Work sequential order: 7<br>Work number: 03 (Change in setting information)<br>Work data: Setting value Y ON | 809 |
| | Work sequential order: 8<br>Work number: 99 (Reactivation of image forming device)<br>Work data: NULL | 810 |
| | Work sequential order: 9<br>Work number: 04 (Installation of extension software)<br>Work data: Extension software S, License S<br>Storage location: USB¥data¥extension software | 811 |
| | Work sequential order: 10<br>Work number: 04 (Installation of extension software)<br>Work data: Extension software T, License T<br>Storage location: USB¥data¥extension software | 812 |
| | Work sequential order: 11<br>Work number: 99 (Reactivation of image forming device)<br>Work data: NULL<br>  Work data: NULL | 813 |

DEVICE, SOFTWARE INSTALLATION METHOD, AND STORAGE MEDIUM

BACKGROUND OF THE INVENTION

Field of the Invention

The present invention relates to a device, a software installation method, and a storage medium.

Description of the Related Art

In recent years, there has been proposed an image forming device that includes various functions such as a print function, a scanner function, a FAX function, a document repository function, and the like and is capable of adding and changing functions depending on each user, a usage environment, or the like. For example, the image forming device is capable of adding an encryption print function by adding software, extending a scan function by enabling the option, and changing an initial display screen by changing setting values.

When the image forming device is installed in the user's usage environment, considerable time and labor are required for a person who is in charge of installation service to perform the initial installation of the image forming device. Thus, there have been various proposals for automating the initial setting operation of the image forming device.

Japanese Patent Laid-Open No. 2011-180772 discloses a system including an equipment management device that transmits setting information associated with network equipment to the network equipment and registers the setting information in the network equipment depending on the request from the same.

It is contemplated that a management device which manages setting information for setting image forming devices automates the initial installation of an image forming device by changing the functions and settings of the image forming device based on the relevant setting information. However, a script describing a processing procedure needs to be created in order to automate the initial installation based on setting information. Then, a special tool such as an editor tool is required in order to create the relevant script. When a script is created by an editor tool, it cannot be judged whether or not an installation appears to have been properly completed until the script is actually executed.

In the case of an initial installation of an image forming device using a management device, a person who is in charge of installation service must work by bringing a management device to an installation location for each image forming device, resulting in an increase in the load on the person who is in charge of installation service. Furthermore, the person who is in charge of installation service may not be able to bring a management device or may not be able to establish connection to a management device from an installation location depending on the installation location of an image forming device. In this case, the person who is in charge of installation service cannot perform initial settings for the image forming device using the management device.

SUMMARY OF THE INVENTION

The present invention provides a system which is capable of automatically setting the second and subsequent image forming devices in accordance with an installation operation of the first image forming device even when a management device is not brought to an installation worksite.

According to an aspect of the present invention, a device that is capable of connecting an external storage device is provided that includes a setting unit configured to, after the external storage device has been connected to the device, perform a software installation on the device based on setting data acquired from the external storage device; and a storage control unit configured to store a script for executing steps required for the software installation executed by the setting unit in ordered sequence in the external storage device. When the script has already been stored in the external storage device upon connection of the external storage device to the device, the setting unit performs the software installation by implementing the steps in the ordered sequence in accordance with the script.

Further features of the present invention will become apparent from the following description of exemplary embodiments with reference to the attached drawings.

BRIEF DESCRIPTION OF THE DRAWINGS

FIG. 4 illustrates an exemplary format of a script created by automatic setting software.

FIG. 5 illustrates an exemplary decision table for specifying an installation operation from the state change of an image forming device.

FIG. 6 is a flowchart illustrating an example of processing upon activation of an image forming device.

FIG. 9 illustrates an exemplary script created by automatic setting software.

DESCRIPTION OF THE EMBODIMENTS

First Embodiment

Figure 1:
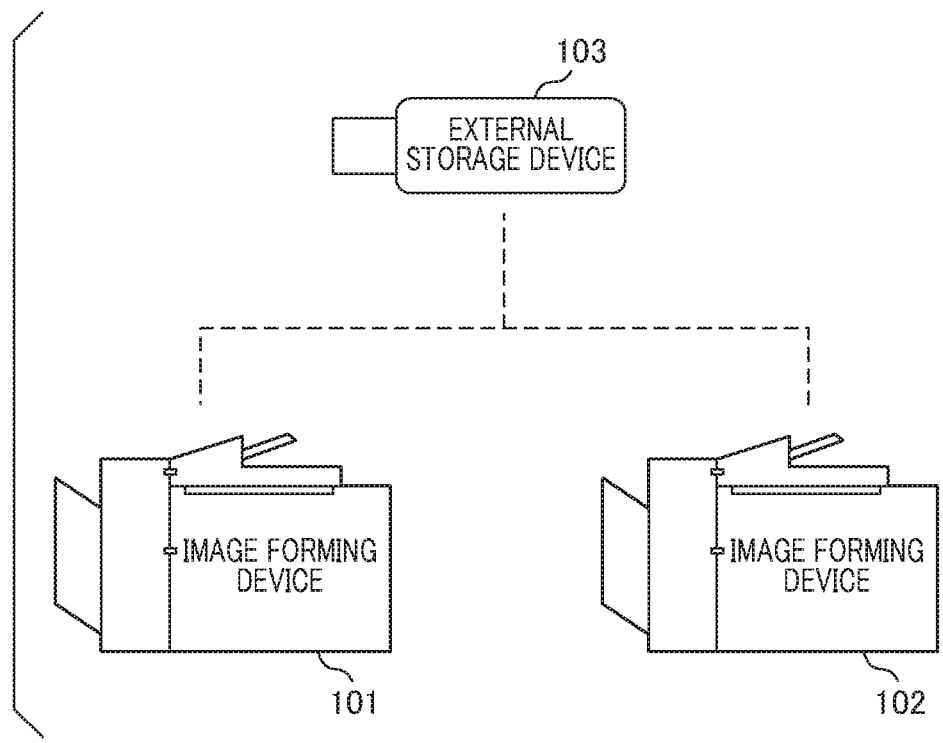
FIG. 1 illustrates an exemplary configuration according to the present embodiment.

Hereinafter, preferred embodiments of the present invention will now be described with reference to the accompanying drawings. Firstly, a description will be given of the terms used in the present embodiment.

The term "additional option" refers to a function that enables additional functions and extension functions to be available by enabling them which are disabled in the initial state of an image forming device when an option license is provided to the image forming device in the initial state. The function itself to be available is provided in an image forming device in the initial state, and thus, no new software is required.

The term "setting information" refers to a collection of various device setting values relating to various functions of an image forming device. The term "device setting value" refers to a value to be set in an image forming device and refers to a parameter of software for controlling the operation of units provided in the image forming device. The operation of an image forming device is switched upon changing the device setting value. In addition to setting information of extension software for realizing the aforementioned additional functions or extension functions, there is also setting information of software such as firmware for controlling a controller of an image forming device.

The term "extension software" refers to software for realizing addition of a new function and extension of an existing function to an image forming device in the initial state. Extension software is managed so as not to be able to be installed on an image forming device if there is no appropriate software license associated with identification information (e.g., identifier) of an image forming device.

The term "software installation" refers to processing to install required software on an image forming device by a person who is in charge of installation service to thereby reflect a setting value required for the installed software as a software setting value. Only installation of software may also be referred to as "software installation". Only reflection of a setting value required for the installed software as a software setting value may also be referred to as "software installation".

The term "setting operation" refers to an operation for setting an image forming device, which includes software installation. Software installation consists of a plurality of steps. Software installation includes, for example, a step of updating firmware and a step of reflecting a device setting value after update of firmware. In addition, software installation includes, for example, a step of installing an application and a step of reflecting an application setting value after installation of the application.

The term "script" refers to a command for executing steps required for software installation in ordered sequence. Software can be installed on an image forming device by executing steps set in the script. The aforementioned description has been given of main terms used herein. Terms other than those expressly set forth herein will be described as appropriate.

FIG. 1 is a diagram illustrating an exemplary configuration according to the present embodiment. Unless otherwise specified, it goes without saying that the present invention is applicable to a single device or a system consisting of a plurality of devices as long as the functions of the present invention can be implemented. Unless otherwise specified, it goes without saying that the present invention is also applicable to a system that performs processing by a connection via a network such as LAN, WAN, or the like as long as the functions of the present invention can be implemented, where LAN is an abbreviation for Local Area Network and WAN is an abbreviation for Wide Area Network.

Each of image forming devices 101 and 102 is a device that includes a print function, a copy function, a facsimile function, a transmission function, and a function for adding extension software. Each image forming device holds an identifier for uniquely identifying its machine body and a model name for identifying the type of the image forming device in a life cycle from shipping to disposal of the same. The image forming devices 101 and 102 have the same configuration.

A person who is in charge of installation service can operate an image forming device so as to perform installation of firmware, enablement of additional option, change in setting values, installation of extension software, and activation, termination and reactivation of the image forming device. The person who is in charge of installation service is an operator who has expertise relating to an image forming device and performs, in a customer environment, an installation operation of an image forming device and an installation operation of software, maintenance work or the like of an image forming device on behalf of customers. The customer-side administrator may also perform these operations. Installation of firmware, enablement of additional option, change in setting values, installation of extension software, activation, termination, and reactivation of the image forming device can also be performed by software which operates inside and outside the image forming device.

An application setting value corresponding to an application installed on an image forming device is set therein. The term "application setting value" refers to a value to be set in an image forming device and a parameter for controlling the operation of the application installed on the image forming device. The term "setting value" in the present embodiment refers to at least one setting value of a device setting value and an application setting value. An image forming device can acquire a setting value from the exterior via a removable memory or the like and can update (import) the setting value held by the image forming device to the acquired setting value.

Here, data including firmware, application, a license file, an application setting value, a device setting value, and the like of an image forming device is described as "setting data". The setting data indicates data required for operating an image forming device. In other words, the setting data is data including a software program and a setting value to be set for the software program. When only software is called as "setting data", only a software setting value may also be called as "setting data". In the present embodiment, a content set in the script stored in an external storage device 103 is also included in setting data.

An image forming device includes an external storage device interface (hereinafter referred to as "I/F") and can read and write data stored in the external storage device 103 by connecting the external storage device 103 to the relevant I/F.

The external storage device 103 can be attached to or detached from the image forming devices 101 and 102. The external storage device 103 is, for example, a USB (Universal Serial Bus) memory. The external storage device 103 can store firmware, various license information, setting information, extension software, other files, and the like which correspond to the image forming devices 101 and 102. The external storage device 103 can also store automatic setting software and a script. While two image forming devices 101 and 102 are shown in FIG. 1, the number of image forming devices is not limited thereto.

Figure 2:
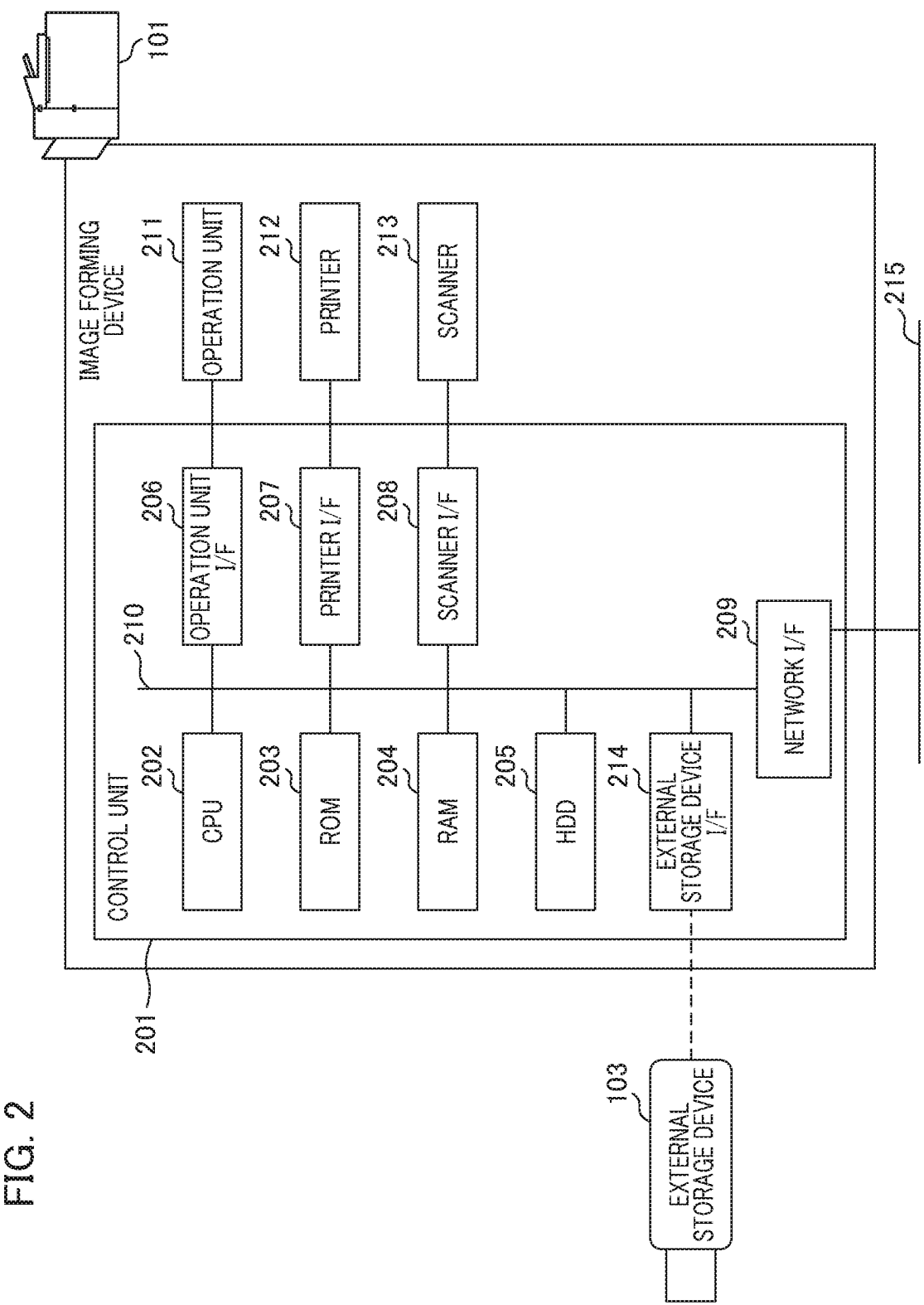
FIG. 2 illustrates an exemplary hardware configuration of an image forming device.

FIG. 2 is a diagram illustrating an exemplary hardware configuration of an image forming device. A control unit 201 including a CPU 202 integrally controls the image forming device 101, where CPU is an abbreviation for Central Processing Unit. The CPU 202 reads a computer program stored in a ROM 203 to thereby execute various types of control processing, where ROM is an abbreviation for Read Only Memory. A RAM 204 is used as a temporal storage area such as a main memory, a work area, or the like for the CPU 202, where RAM is an abbreviation for Random Access Memory.

An HDD 205 is an auxiliary storage device that stores image data, various programs, and various information tables, where HDD is an abbreviation for Hard Disk Drive. An operation unit I/F 206 connects an operation unit 211 to the control unit 201. The operation unit 211 is provided with a display unit (a liquid crystal display unit or the like having a touch panel function) and a keyboard.

A printer I/F 207 connects a printer 212 to the control unit 201. Image data to be printed by the printer 212 is transferred from the control unit 201 to the printer 212 via the printer I/F 207 and is printed by the printer 212 onto a recording medium. A scanner I/F 208 connects a scanner 213 to the control unit 201. The scanner 213 generates image data by reading an image on an original document and passes the image data to the control unit 201 via the scanner I/F 208.

A network I/F 209 performs transmission/reception of various information to/from various types of network equipment on a LAN 215. An external storage device I/F 214 connects an image forming device to the external storage device 103. The image forming device transmits and receives data stored in the external storage device 103 via the external storage device I/F 214.

When the power supply of the image forming device 101 is turned ON, the CPU 202 initializes a device in accordance with the boot program in the ROM 203. Then, the CPU 202 loads an OS (Operating System) on the HDD 205 or the like, and then operates various applications and the like.

Figure 3:
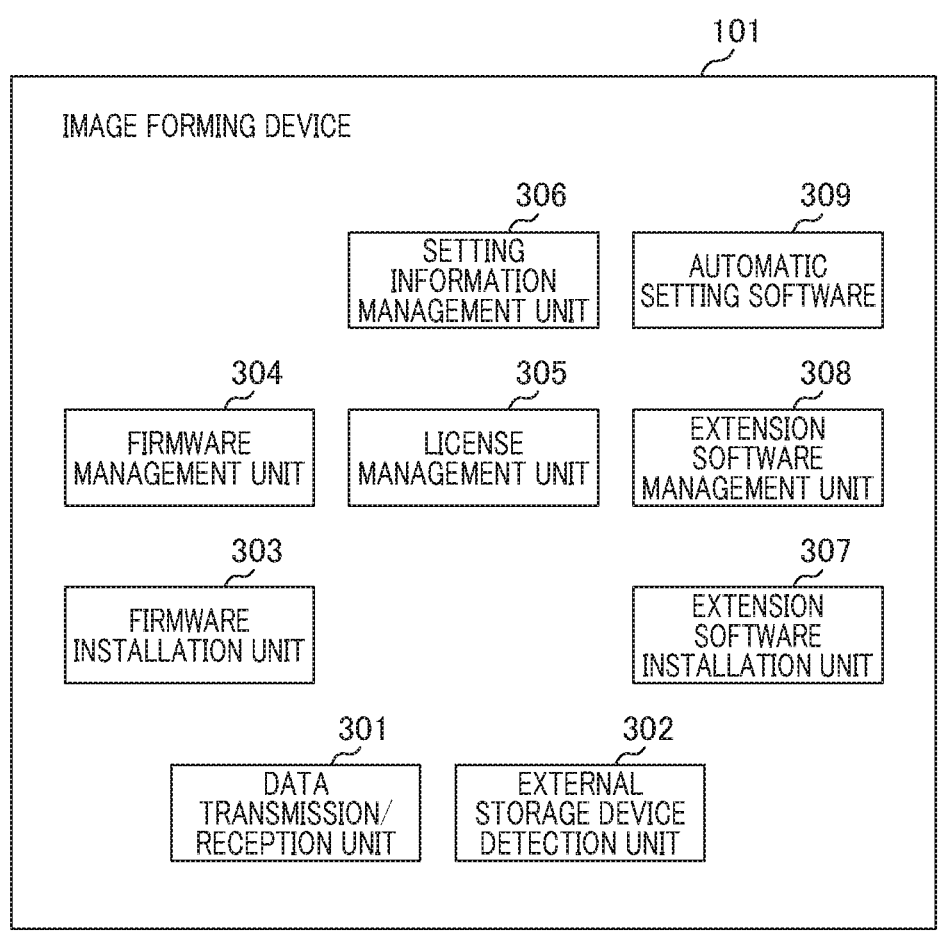
FIG. 3 is an exemplary functional block diagram of an image forming device.

FIG. 3 is an exemplary functional block diagram of an image forming device. The image forming device 101 includes a data transmitting/receiving unit 301, an external storage device detecting unit 302, a firmware installing unit 303, a firmware managing unit 304, and a license managing unit 305. The image forming device 101 also includes a setting information managing unit 306, an extension software installing unit 307, an extension software managing unit 308, and an automatic setting software 309. The program for realizing the functions of the processing units shown in FIG. 3 is stored in the ROM 203 or the HDD 205 of the image forming device 101 and is executed by the CPU 202. Various types of information to be used upon execution of the program are stored in the ROM 203 or the HDD 205 of the image forming device 101 and are exchanged between software function modules. The image forming device 101 performs communication with an external device using the network I/F 209 and the external storage device I/F 214 of the image forming device 101.

The data transmitting/receiving unit 301 performs general transmission/reception of data to/from an external device such as the external storage device 103 or the like. The data transmitting/receiving unit 301 transmits requests from the processing units to an external device, and assigns the responses received from the external device to each processing unit.

The external storage device detecting unit 302 detects that the external storage device 103 is connected to the external storage device I/F 214, and notifies the extension software installing unit 307 of the detection.

The firmware installing unit 303 acquires firmware from an external device such as the external storage device 103 or the like according to an instruction given from the operation unit 211 and the automatic setting software 309 and installs the acquired firmware on an image forming device.

The firmware managing unit 304 manages firmware installed on an image forming device. The firmware managing unit 304 transmits firmware-related information such as a name, version number, and the like of firmware according to a request from the automatic setting software.

The license managing unit 305 manages the added option function of an image forming device. When an option license is provided from the operation unit 211 and the automatic setting software 309, the license managing unit 305 enables additional functions and extension functions to be available by enabling them which are disabled in the initial state of an image forming device.

The license managing unit 305 transmits additional option-related information such as the number of enabled additional options, the names of the additional options, and the like depending on a request from the automatic setting software.

The setting information managing unit 306 manages setting information relating to various functions of an image forming device. The setting information managing unit 306 changes setting information of an image forming device according to an instruction given from the operation unit 211 and the automatic setting software 309. Upon changing the setting information, the operation of the image forming device is switched.

The setting information managing unit 306 also transmits current setting information of an image forming device according to a request from the automatic setting software. The extension software installing unit 307 installs extension software on an image forming device using software license information according to an instruction given from the operation unit 211 and the automatic setting software 309. After installation has been completed, the extension software is managed by the extension software managing unit 308.

When there is no appropriate software license associated with an identifier of an image forming device, the extension software installing unit 307 does not provide permission to install extension software.

Upon reception of a notification indicating that the external storage device 103 has been connected to an image forming device from the external storage device detecting unit 302, the extension software installing unit 307 acquires automatic setting software and installs it on the image forming device.

The extension software managing unit 308 manages extension software installed on an image forming device. The additional function and the extension function of an image forming device are realized by executing extension software via the extension software managing unit 308.

The extension software managing unit 308 transmits extension software-related information such as the number of extension softwares installed on an image forming device, the names of the extension softwares, and the like depending on a request from the automatic setting software 309.

The automatic setting software 309 is one of extension software which can be installed on an image forming device. The automatic setting software 309 includes two operation modes for recording and reproducing an installation operation and automatically determines the operation mode itself with reference to a script stored in the external storage device 103 upon activation of an image forming device.

When the automatic setting software 309 is in a recording mode, the automatic setting software 309 specifies the implemented installation operation from the state change of an image forming device, and records the relevant installation operation in the script stored in the external storage device 103.

Even when the HDD 205 in an image forming device has been initialized during an installation operation and even when an image forming device is reactivated, the automatic setting software 309 can continuously record the installation operation in the script while resuming the recording mode and reactivating the image forming device.

When the automatic setting software 309 is in a reproduction mode, the automatic setting software 309 acquires the script stored in the external storage device 103, and automatically sets the image forming device 101 in accordance with the content of the relevant script. Specifically, the automatic setting software 309 performs software installation on the image forming device 101 based on the setting data acquired from the external storage device 103. More specifically, the automatic setting software 309 performs software installation by performing the steps set in the script in ordered sequence.

Reproduction position information is stored in the external storage device 103, and thus, the automatic setting software 309 can continuously perform automatic installation by resuming the reproduction mode even when the HDD 205 in an image forming device has been initialized during an installation operation and even when an image forming device is reactivated.

Next, a description will be given of a script. When there is no script in the external storage device 103 upon activation of an image forming device, the automatic setting software 309 creates a script and stores it in the external storage device 103.

FIG. 4 is a diagram illustrating an exemplary format of a script created by automatic setting software. An area 401 is a machine body identifier area for recording the identifier of an image forming device which has created a script. Upon creation of a script, the automatic setting software 309 acquires the identifier of an image forming device on which the software 309 is running and records the acquired identifier in the machine body identifier area 401.

An area 402 is a machine body model name area for recording the model name of an image forming device which has created a script. Upon creation of a script, the automatic setting software 309 acquires the model name of an image forming device on which the software 309 is running and records the acquired model name in the machine body model name area 402.

An area 403 is an installation operation information area for recording an installation operation. A work sequential order, a work number, work data, and a storage location of the work data are recorded in the installation operation information area 403. The work sequential order indicates the work sequential order of steps required for an installation operation (e.g., software installation). The work number is an identification number for uniquely specifying an installation operation. The work data is a file used in an installation operation, such as a combined file including a collection of firmware, a file for executing extension software, a license file, a setting information file, or the like. In general, firmware and extension software are provided as separate files and cannot be installed simultaneously. After firmware has been installed on the image forming device 101 and the image forming device 101 has been activated, extension software can be installed on the image forming device 101.

When the automatic setting software 309 is in the recording mode, the automatic setting software 309 specifies the installation operation implemented by the image forming device 101 on which the software 309 is running, and records the relevant installation operation in the installation operation information area 403.

Next, a description will be given of processing for specifying an installation operation when automatic setting software is in the recording mode. When the automatic setting software 309 is firstly operated in the recording mode, the automatic setting software 309 creates a log file for recording the operation state of the software 309 itself and an INI file and stores them in the HDD 205. The INI file is a file describing settings relating to the operation of the software 309 itself, such as a file describing the storage location of current information of a script and an image forming device.

The automatic setting software 309 acquires various information from the processing units provided in the image forming device 101. More specifically, the automatic setting software 309 acquires the name and version number of firmware from the firmware managing unit 304, and acquires the number of enabled additional options and the names of additional options from the license managing unit 305.

Furthermore, the automatic setting software 309 acquires current setting information of an image forming device from the setting information managing unit 306, and acquires the number of extension softwares installed on the image forming device and the names of the extension softwares from the extension software managing unit 308. Then, the automatic setting software 309 stores all of the acquired information as the latest state of the image forming device in the external storage device 103.

Next, the automatic setting software 309 acquires various information from the processing units again at a certain specific timing, and compares the acquired various information with the latest state of the image forming device stored in the external storage device 103 to thereby detect a state change. The specific timing may be, for example, a timing after a lapse of a predetermined time from a completion of recording the latest state. The specific timing may also be, for example, a timing upon occurrence of any one of installation of firmware, enablement of additional option, change in setting values, installation of extension software in the operation log of the device. The specific timing may further be, for example, a timing upon reactivation of an image forming device. The automatic setting software 309 specifies the installation operation implemented by the image forming device based on the state change of the detected image forming device.

When a script is stored in the external storage device 103 and the INI file of the automatic setting software 309 itself is absent in the HDD 205 upon resumption of the recording mode of the automatic setting software 309, the automatic setting software 309 determines that the state change "reinstallation+initial activation of setting software" has been detected. The state change "reinstallation+initial activation of setting software" indicates the fact that the automatic setting software 309 has been reinstalled and initially activated. The automatic setting software 309 may also detect a state change using a log file instead of an INI file.

Also, the automatic setting software 309 determines whether or not a script has been stored in an external storage device upon activation of an image forming device and the machine body identifier of the image forming device described in the script matches the machine body identifier of the image forming device on which the relevant automatic setting software is running. When the machine body identifiers match with each other, the automatic setting software 309 determines that the state change "automatic activation of setting software" has been detected.

FIG. 5 is a diagram illustrating an exemplary decision table for specifying an installation operation from the state change of an image forming device. The decision table is stored in a process storage unit (e.g., the HDD 205) in advance. An item 501 indicates a state change of an image forming device, an item 502 indicates an installation operation to be specified from a state change, an item 503 indicates the work number for identifying each installation operation. The installation operation set in the item 502 includes steps required for software installation. The state change is associated with an installation operation and a work number, so that an installation operation and a work number can be specified from a state change.

When the state change is a "change in version of firmware", the automatic setting software 309 specifies the installation operation "installation of firmware" and the work number "01" with reference to the decision table.

When the state change is a "change in the number of enabled additional options", the automatic setting software 309 specifies installation operation "enablement of additional option" and the work number "02" with reference to the decision table.

When the state change is a "change in setting information", the automatic setting software 309 specifies the installation operation "change in setting information" and the work number "03" with reference to the decision table. When the state change is a "change in the number of extension softwares", the automatic setting software 309 specifies the installation operation "installation of extension software" and the work number "04" with reference to the decision table.

When the state change is a "change in version of extension software", the automatic setting software 309 specifies the installation operation "installation of extension software" and the work number "04" with reference to the decision table. When the state change is "reinstallation+ initial activation of setting software", the automatic setting software 309 specifies the installation operation "initialization of hard disk" and the work number "98" with reference to the decision table. When the state change is "automatic activation of setting software", the automatic setting software 309 specifies the installation operation "reactivation of image forming device" and the work number "99" with reference to the decision table.

Next, a description will be given of an example of processing for the initial installation of an image forming device with reference to FIGS. 6 to 9. In this example, a person who is in charge of installation service stores firmware, extension software, a software license, an option license, setting information, automatic setting software, and an installer setting file in advance in the external storage device 103.

FIG. 6 is a flowchart illustrating an example of processing upon activation of an image forming device. A description will be given of processing for automatically installing the automatic setting software 309 upon activation of an image forming device with reference to FIG. 6.

When a person who is in charge of installation service turns on the power supply of the image forming device 101 after the external storage device 103 has been attached to the image forming device 101, the image forming device 101 is activated (step S601). The external storage device detecting unit 302 of the image forming device 101 determines whether or not the external storage device 103 has been attached to the image forming device 101 (step S602).

When the external storage device detecting unit 302 determines that the external storage device 103 has not been attached to the image forming device 101, the processing ends. When the external storage device detecting unit 302 determines that the external storage device 103 has been attached to the image forming device 101, the processing proceeds to step S603. In this example, the external storage device 103 has been attached to the image forming device 101, and thus, the processing proceeds to step S603.

The extension software installing unit 307 of the image forming device 101 acquires an installer setting file stored in the external storage device 103 (step S603).

Information relating to automatic setting software to be installed, that is, a version number, a created date, license information, storage location, and the like are described in the installer setting file.

Next, the extension software installing unit 307 queries the extension software managing unit 308 so as to confirm whether or not the automatic setting software 309 described in the installer setting file has been installed on the image forming device 101 (step S604). When the automatic setting software 309 has been installed on the image forming device 101, the processing proceeds to step S606.

When the automatic setting software 309 has not been installed on the image forming device 101, the processing proceeds to step S605. The extension software installing unit 307 installs the automatic setting software 309 on the image forming device 101. Then, the extension software managing unit 308 activates the automatic setting software 309 (step S606).

Figure 7:
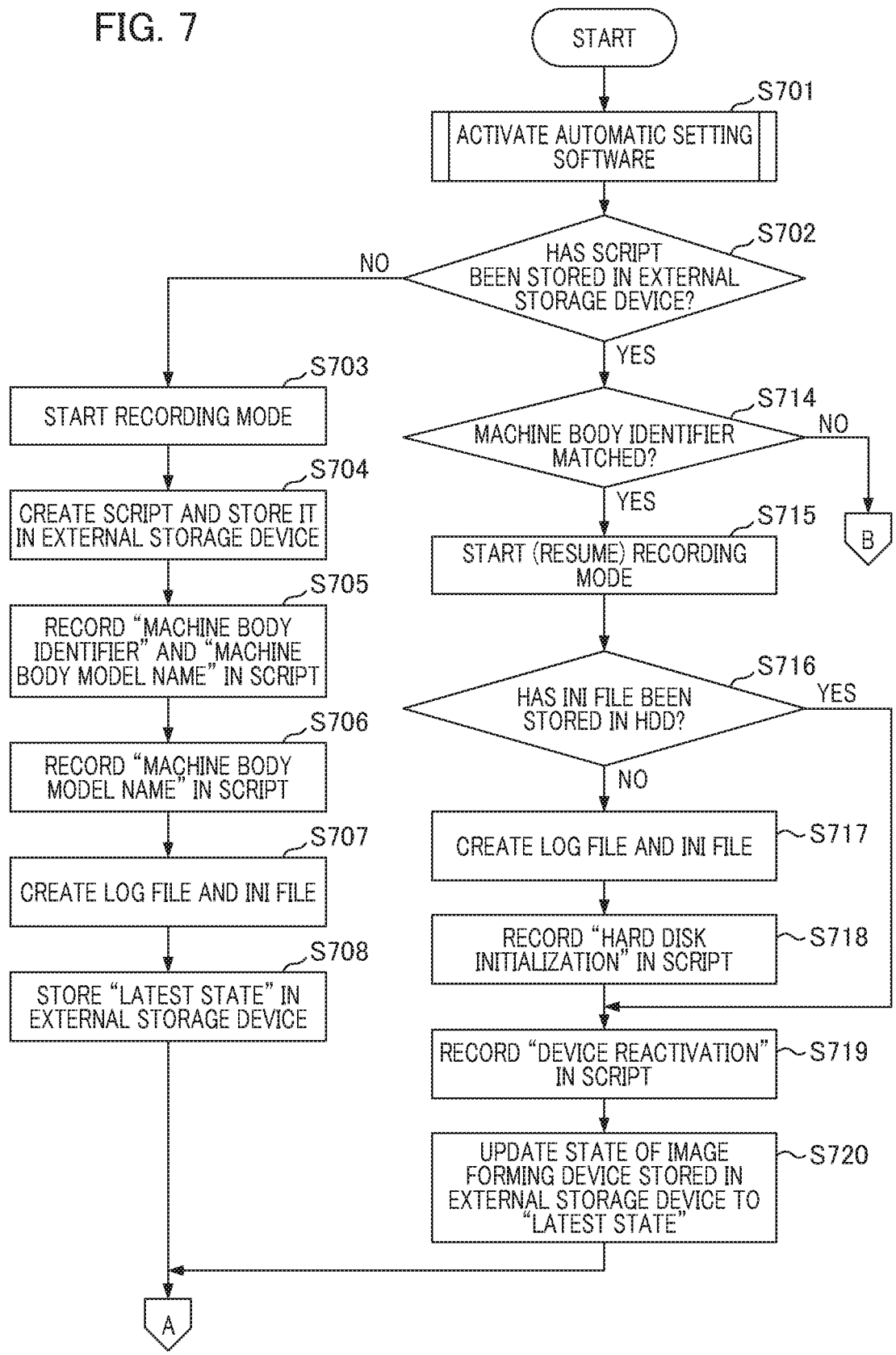
FIG. 7 is a flowchart illustrating an example of operation processing performed by the image forming device of a first embodiment.
Figure 8:
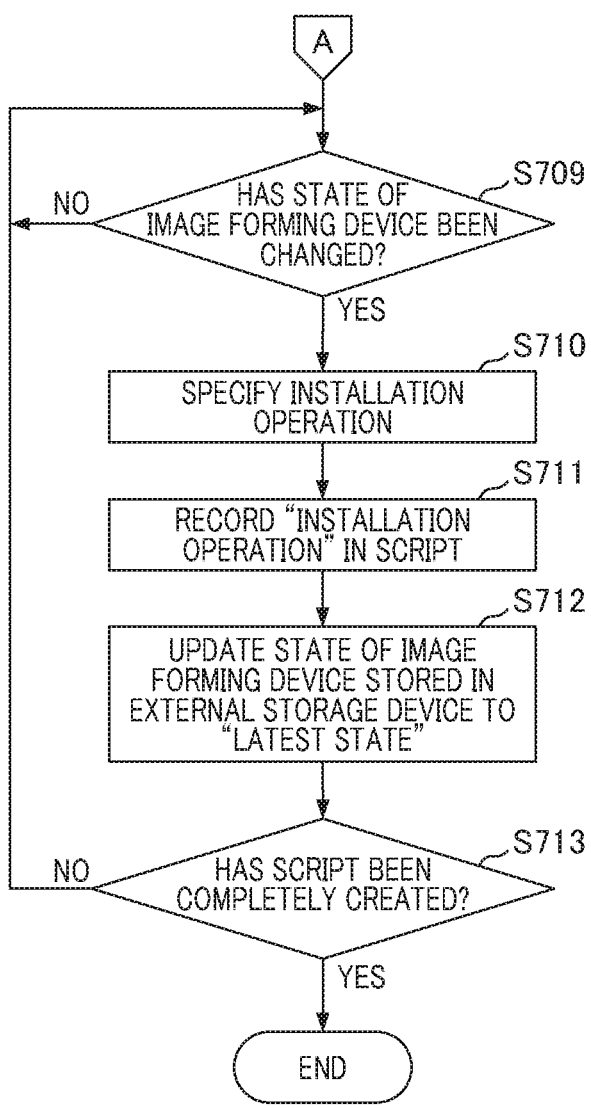
FIG. 8 is a flowchart illustrating an example of operation processing performed by the image forming device of the first embodiment.
Figure 10:
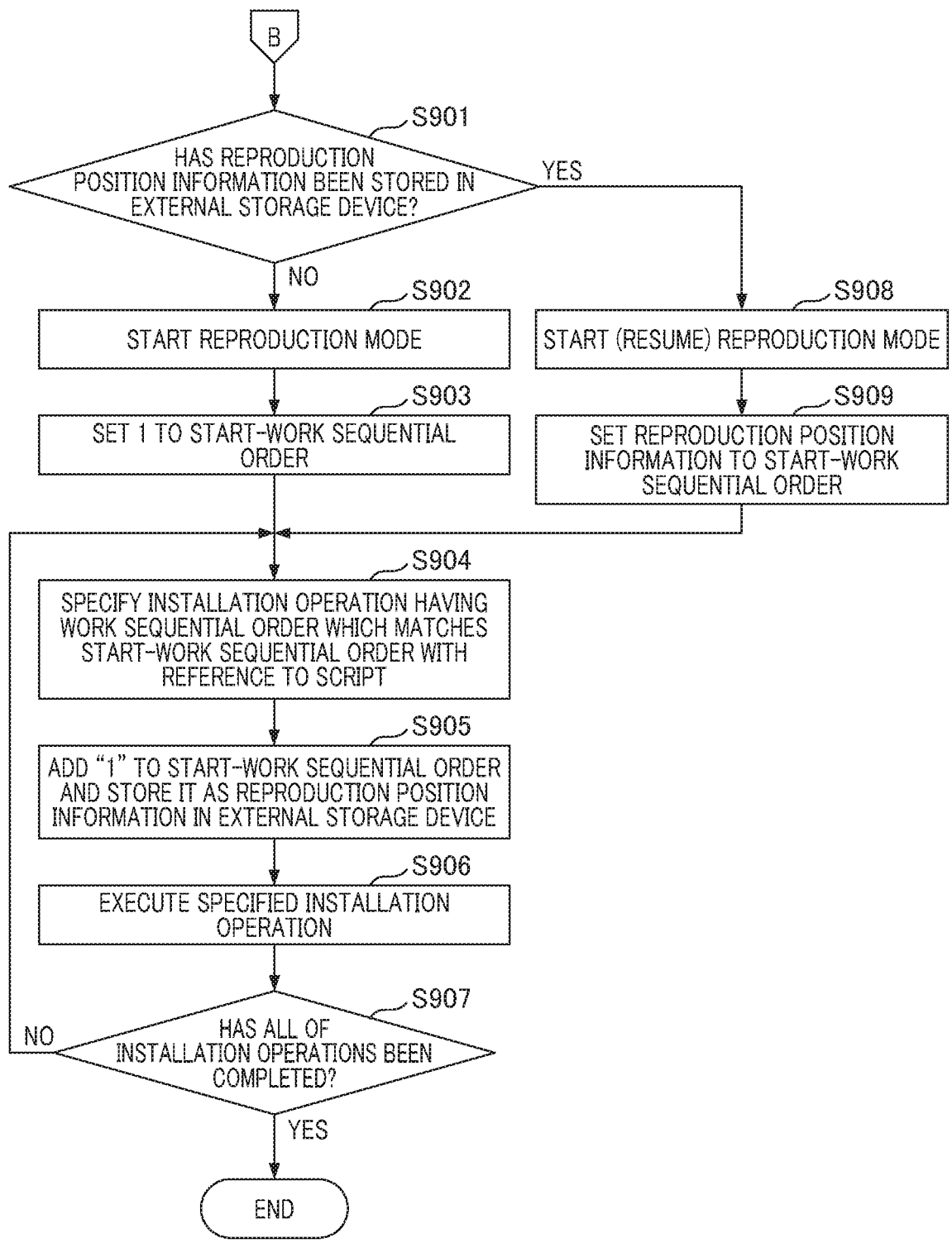
FIG. 10 is a flowchart illustrating an example of automatic setting software operation processing in a reproduction mode.

FIGS. 7, 8 and 10 are flowcharts illustrating an example of operation processing performed by the image forming device of the first embodiment. Firstly, the automatic setting software 309 is activated as shown in FIG. 7 (step S701). Next, the automatic setting software 309 determines whether or not a script has been stored in the external storage device 103 (step S702).

When the automatic setting software 309 determines that a script has been stored in the external storage device 103, the processing proceeds to step S714. On the other hand, when the automatic setting software 309 determines that no script has been stored in the external storage device 103, the processing proceeds to step S703, and the automatic setting software 309 starts recording mode processing.

Next, the automatic setting software 309 creates a new script and stores it in the external storage device 103 (step S704). In other words, when no script is stored in the external storage device 103 upon connection of the external storage device 103 to the image forming device 101, the automatic setting software 309 generates a script and stores it in the external storage device 103. Then, the automatic setting software 309 acquires the identifier of the image forming device 101 on which the software 309 is running, and records the acquired identifier in the machine body identifier area for the script (step S705).

Next, the automatic setting software 309 acquires the model name of the image forming device 101 on which the software 309 is running, and records the acquired model name in the machine body model name area for the script (step S706). Then, the automatic setting software 309 creates a log file and an INI file and stores them in the HDD 205 (step S707). Specifically, when the automatic setting software 309 firstly stores a script in the external storage device 103, the automatic setting software 309 generates a log file and an INI file as predetermined file information and stores them in a file storage unit (the HDD 205).

Next, the automatic setting software 309 acquires various information from the processing units of the image forming device 101, and stores the acquired various information as the latest state of the image forming device 101 in the external storage device 103 (step S708). Then, the processing proceeds to step S709 shown in FIG. 8.

Next, the automatic setting software 309 acquires various information from the processing units again and compares the acquired various information with the latest state of the image forming device 101 stored in the external storage device 103. Then, the automatic setting software 309 determines whether or not the state of the image forming device 101 has been changed based on the result of comparison between the various information and the latest state (step S709). When a person which is in charge of installation service operates an image forming device so as to perform installation of firmware, enablement of additional option, change in setting values, and installation of extension software, the state of the image forming device changes.

When the automatic setting software 309 determines that the state of the image forming device 101 has not been changed, the processing returns to step S709. When the automatic setting software 309 determines that the state of the image forming device 101 has been changed, the processing proceeds to step S710.

Then, the automatic setting software 309 specifies an installation operation associated with the state change of an image forming device from the HDD 205 with reference to the decision table shown in FIG. 5 (step S710).

Next, the automatic setting software 309 records the specified installation operation in the installation operation information area for the script (step S711). Specifically, the automatic setting software 309 functions as a storage control unit that stores a script in the external storage device 103. For example, when a person which is in charge of installation service performs the version update of firmware by operating the image forming device 101, the automatic setting software 309 detects a "change in version of firmware". The automatic setting software 309 specifies the installation operation "installation of firmware" with reference to the decision table shown in FIG. 5.

The automatic setting software 309 acquires a combined file including a collection of firmware used by a person which is in charge of installation service from an operation log and its storage location, and records the acquired combined file and its storage location in the installation operation information area for the script (e.g., area 804 shown in FIG. 9).

The automatic setting software 309 acquires various information from the processing units again, and updates the state of the image forming device stored in the external storage device 103 to the latest state by using the acquired information (step S712).

Next, the automatic setting software 309 determines whether or not the script has been completely created (step S713). When the person which is in charge of installation service presses a button (not shown) provided in the image forming device 101, the automatic setting software 309 determines that the script has been completely created. When the automatic setting software 309 determines that the script has not been completely created, the processing returns to step S709. When the automatic setting software 309 determines that the script has been completely created, the processing ends.

When the person which is in charge of installation service reactivates the image forming device 101 while the automatic setting software 309 is in operation in the recording mode, the automatic setting software 309 is reactivated in step S701 shown in FIG. 7 through the processing described with reference to FIG. 6. When it is determined by the determination processing in step S702 that a script is stored in the external storage device 103, the processing proceeds to step S714.

Next, the automatic setting software 309 acquires the identifier of an image forming device on which the software 309 is running. Then, the automatic setting software 309 determines whether or not the acquired identifier matches the machine body identifier recorded in the machine body identifier area for the script stored in the external storage device 103 (step S714). When the automatic setting software 309 determines that the acquired identifier does not match the machine body identifier recorded in the machine body identifier area for the script, the processing proceeds to step S901 shown in FIG. 10, and the image forming device starts the reproduction mode processing. On the other hand, when the automatic setting software 309 determines that the acquired identifier matches the machine body identifier recorded in the machine body identifier area for the script, the processing proceeds to step S715. Then, the automatic setting software 309 resumes the recording mode processing.

When the recording mode processing is resumed, the automatic setting software 309 determines whether or not an INI file has been stored in the HDD 205 (step S716). When the automatic setting software 309 determines that an INI file has been stored in the HDD 205, the processing proceeds to step S719.

On the other hand, when the automatic setting software 309 determines that no INI file has been stored in the HDD 205, the processing proceeds to step S717. Then, the automatic setting software 309 creates a log file and an INI file and stores them in the HDD 205 (step S717).

Next, the automatic setting software 309 specifies "hard disk initialization" with reference to the decision table, and records it in the installation operation information area for the script (step S718). The term "hard disk initialization" refers to a step of initializing a hard disk.

Next, the automatic setting software 309 specifies "reactivation of image forming device" with reference to the decision table, and records it in the installation operation information area for the script (step S719). The term "reactivation of image forming device" refers to a step of reactivating the image forming device 101.

Next, the automatic setting software 309 acquires various information from the processing units provided in the image forming device 101, and stores it as the latest state of the image forming device in the external storage device 103 (step S720). Then, the processing proceeds to step S709 shown in FIG. 8.

FIG. 9 is a diagram illustrating an exemplary script created by automatic setting software when the person which is in charge of installation service operates the image forming device 101 so as to perform the installation operation in ordered sequence. It is assumed that the person which is in charge of installation service has been carried out the installation operation consisting of eleven steps from (1) to (11) in the following in ordered sequence.

(1) initialize a hard disk
(2) install firmware stored in USB\data\firmware by using XYZ001-002
(3) reactivate an image forming device
(4) enable an additional option A stored in USB\data\additional option by using a license A
(5) change setting information stored in USB\data\setting information by using setting information W
(6) change a setting value X to level 7
(7) change a setting value Y to ON
(8) reactivate the image forming device
(9) install extension software S stored in USB\data\extension software by using a license file S
(10) install extension software T stored in USB\data\extension software by using a license file T
(11) reactivate the image forming device As shown in FIG. 9, the identifier "AAA0001" of the image forming device 101 is recorded in the machine body identifier area for the script 801 and the model name "XYZ001" of the image forming device 101 is recorded in the machine body model name area 802. The work sequential order of the installation operation consisting of eleven steps, the work number, work data, and the storage location for the work data are recorded in each of the installation operation information areas 803 to 813 for the script.

FIG. 10 is a flowchart illustrating an example of automatic setting software operation processing in a reproduction mode. When the person which is in charge of installation service turns on the power supply of the image forming device 102 after the external storage device 103 storing the script shown in FIG. 8 has been attached to the image forming device 102, the image forming device 102 is activated.

Next, the processing described with reference to FIG. 6 starts and then the automatic setting software 309 is installed on the image forming device 102, so that the automatic setting software 309 is activated. Then, the processing described with reference to FIG. 7 starts, and the automatic setting software 309 starts the reproduction mode processing shown in FIG. 10 through the processing in steps S702 and S714.

When the reproduction mode processing starts, the automatic setting software 309 determines whether or not reproduction position information has been stored in the external storage device 103 (step S901).

When reproduction position information has not been stored in the external storage device 103, the processing proceeds to step S902. Then, the automatic setting software 309 starts the reproduction mode, and sets "1" to a start-work sequential order (step S903).

Next, the automatic setting software 309 specifies an installation operation having a work sequential order which matches the start-work sequential order with reference to the script stored in the external storage device 103 (step S904). In this example, since the start-work sequential order "1" has been set, the automatic setting software 309 specifies "initialization of hard disk" having the work sequential order "1".

Next, the automatic setting software 309 adds "1" to the start-work sequential order. Then, the automatic setting software 309 updates reproduction position information in the relevant start-work sequential order (step S905). In this example, the start-work sequential order and reproduction position information are set to "2".

Next, the automatic setting software 309 executes the installation operation specified in step S904 (step S906). Next, the automatic setting software 309 determines whether or not all of the installation operations described in the script has been completed (step S907). When all of the installation operations described in the script has been completed, the processing ends. When any one of the installation operations described in the script has not been completed, the processing returns to step S904, and the processing is repeated until all of the installation operations is completed.

In the present embodiment, in second-time step S906, the automatic setting software 309 executes "installation of firmware" having the work sequential order "2". More specifically, the automatic setting software 309 instructs the firmware installing unit to install firmware stored in USB\data\firmware by using XYZ001-002.

The firmware installing unit 303 installs firmware in accordance with the instruction given by the automatic setting software 309. Likewise, in third-time step S906, the automatic setting software 309 executes "reactivation of image forming device" having the work sequential order "3". At this time, the start-work sequential order and reproduction position information are set to "4".

When the image forming device is reactivated by automatic setting software, the automatic setting software 309 determines whether or not reproduction position information has been stored in the external storage device 103 in step S901 shown in FIG. 9 through the processing described with reference to FIGS. 6 and 7. In this example, since reproduction position information has been stored in the external storage device 103, the processing proceeds to step S908, and the automatic setting software 309 resumes the reproduction mode.

Next, the automatic setting software 309 sets reproduction position information to the start-work sequential order (step S909). Specifically, when the image forming device 101 is reactivated during software installation, the automatic setting software 309 specifies a resumption position in a step of installing software with reference to the work sequential order included in the script. In this example, the reproduction position information "4" is set as the start-work sequential order. Then, the processing proceeds to step S904.

Next, the automatic setting software 309 acquires the script stored in the external storage device 103. Then, the automatic setting software 309 specifies an installation operation having a work sequential order which matches the start-work sequential order with reference to the script (step S904). In this example, since the start-work sequential order "4" has been set, the automatic setting software 309 specifies "enablement of additional option" having the work sequential order "4".

Next, the automatic setting software 309 adds "1" to the start-work sequential order. Then, the automatic setting software 309 updates reproduction position information in the relevant start-work sequential order (step S905). In this example, the start-work sequential order and reproduction position information are set to "5".

Next, the automatic setting software 309 executes the installation operation specified in step S904 (step S906). The automatic setting software 309 executes "enablement of additional option" having the work sequential order "4". More specifically, the automatic setting software 309 instructs the license managing unit 305 to enable the additional option A stored in USB\data\additional option by using the license A. The license managing unit 305 enables the additional option A in accordance with the instruction given by the automatic setting software 309.

Likewise, the processing is repeated until all of the installation operations described in the script is completed. The aforementioned procedure allows the automatic setting software 309 to record the installation operation of the image forming device 101 in the script and to install the image forming device 102 in accordance with the relevant script, so that automatic setting of the image forming device 101 can be realized. Specifically, even when there is no editor tool or management device at an installation worksite, the second and subsequent image forming devices can be automatically set in accordance with the installation operation of the first image forming device. Thus, the installability of the image forming device improves, resulting in a reduction in load on the person who is in charge of installation service.

Second Embodiment

According to the image forming device of the first embodiment, even when the model type of the image forming device 101 is different from that of the image forming device 102, software can be installed on the image forming device 102 using the script created by the image forming device 101.

However, when the model type-dependent installation operation is included in the script, a part of setting information may not be identical to each other. In other words, an image quality is set to a level different from the level of the image quality relating to the setting operation recorded in the script.

When setting information corresponding to the setting operation recorded in the script is not identical to each other upon automatic setting of the image forming device using the script, the image forming device of the second embodiment reports a warning message.

Figure 11:
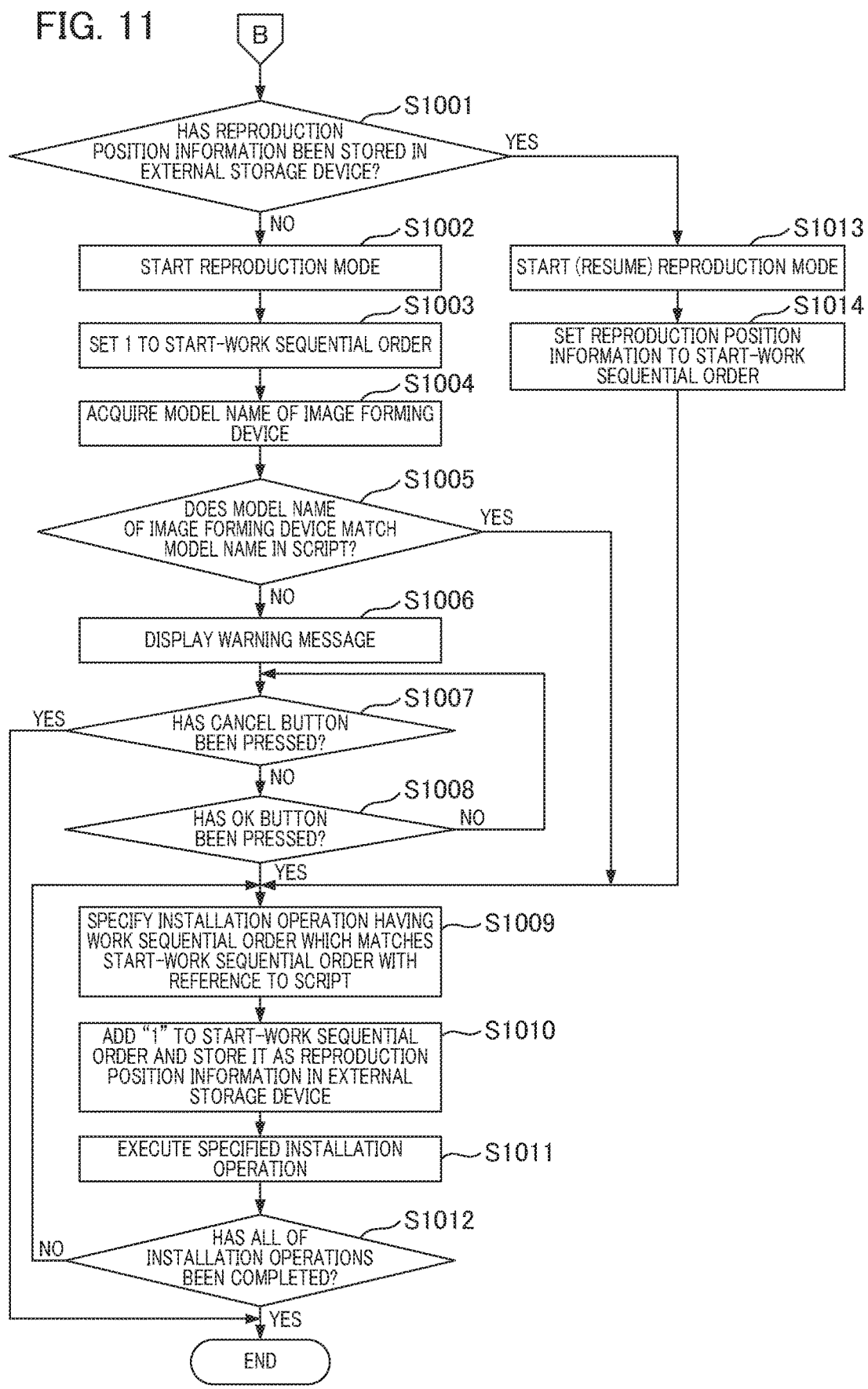
FIG. 11 is a flowchart illustrating an example of automatic setting software operation processing in a reproduction mode.

FIG. 11 is a flowchart illustrating an example of automatic setting software operation processing in a reproduction mode according to the second embodiment. When a person who is in charge of installation service turns on the power supply of the image forming device 102 after the external storage device 103 storing the script shown in FIG. 8 has been attached to the image forming device 102, the image forming device 102 is activated. Then, the processing described with reference to FIG. 6 starts and then the automatic setting software 309 is installed on the image forming device 102, so that the automatic setting software 309 is activated.

Next, the processing described with reference to FIG. 7 starts, and the automatic setting software 309 starts the reproduction mode processing through the processing in steps S702 and S714. When the reproduction mode processing starts, the processing proceeds to step S1001 shown in FIG. 11.

Steps S1001, S1002, S1003, S1009, S1010, S1011, S1012, S1013, and S1014 shown in FIG. 11 are the same as steps S901, S902, S903, S904, S905, S906, S907, S908, and S909 shown in FIG. 10, respectively. In step S1004 shown in FIG. 11, the automatic setting software 309 acquires the model name of an image forming device on which the software 309 is running. Then, the automatic setting software 309 determines whether or not the model name acquired in step S1105 matches the model name stored in the machine body model name area for the script stored in the external storage device 103 (step S1005).

When the model name acquired in step S1105 matches the model name stored in the machine body model name area for the script stored in the external storage device 103, the processing proceeds to step S1009.

When the model name acquired in step S1105 does not match the model name stored in the machine body model name area for the script stored in the external storage device 103, the processing proceeds to step S1006. Then, the automatic setting software 309 outputs warning information. More specifically, the automatic setting software 309 displays a warning message display screen on the display unit of the image forming device.

Figure 12:
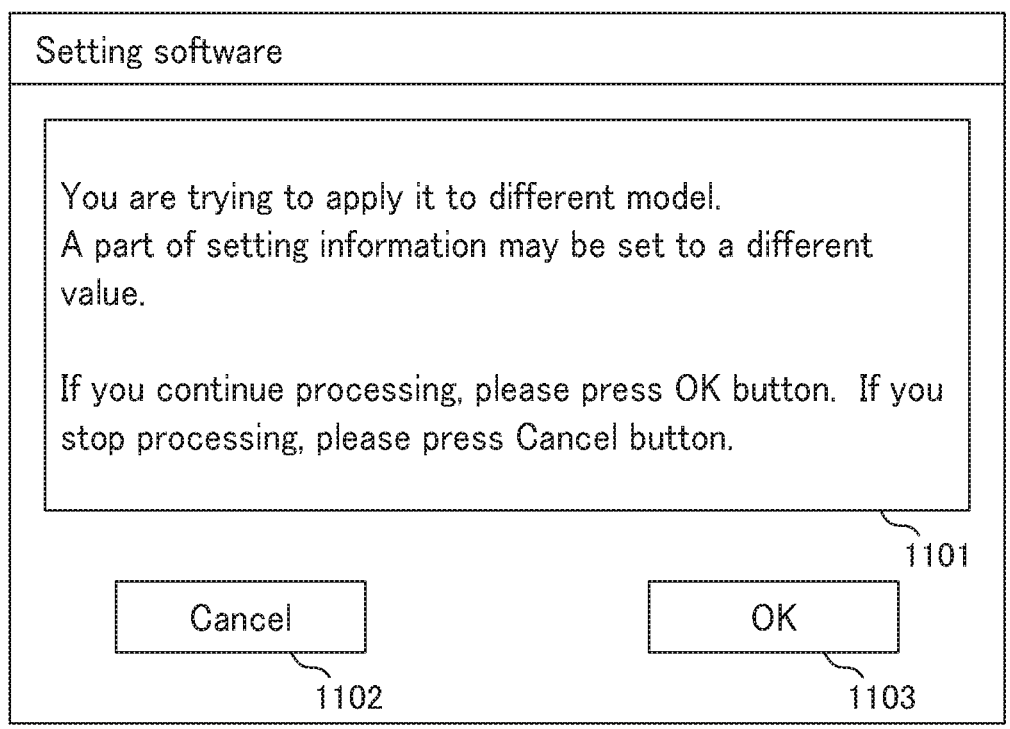
FIG. 12 illustrates an exemplary warning message screen.

FIG. 12 is a diagram illustrating an exemplary warning message screen. An area 1101 is a warning message display area. A button 1102 is a cancel button. A button 1103 is an OK button.

For example, assume the case where the image quality of the image forming device 101 can be set to ten steps from level 1 to level 10 and the image quality of the image forming device 102 having a model name different from that of the image forming device 101 can be set to five steps from level 1 to level 5. Assume that the image quality level of the image forming device 101 is set to level 10 and the relevant setting operation is recorded in the script. When the automatic setting software 309 is installed on the image forming device 102 using the relevant script, the image quality of the image forming device 102 is set to level 5. Thus, in this case, the automatic setting software 309 displays a warning message indicating "a part of setting information is set to a different value" as shown in FIG. 11.

Referring back to FIG. 11, the automatic setting software 309 determines whether or not the cancel button 1102 has been pressed (step S1007). When the cancel button 1102 has been pressed, the processing ends. When the cancel button 1102 has not been pressed, the processing proceeds to step S1008.

Next, the automatic setting software 309 determines whether or not the OK button 1103 has been pressed (step S1008). When the OK button 1103 has not been pressed, the processing proceeds to step S1007. When the OK button 1103 has been pressed, the processing proceeds to step S1009.

According to the image forming device of the second embodiment described above, when setting information corresponding to the setting operation recorded in the script are not identical to each other upon automatic setting of the image forming device using the script, the image forming device of the second embodiment can notify the person who is in charge of installation service of a warning message.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-028547 filed on Feb. 18, 2013, which is hereby incorporated by reference herein in its entirety.

What is claimed is:

1. An image forming device capable of connecting with a portable storage medium, comprising:
   an acquisition unit connected with the portable storage medium, and configured to acquire, from the portable storage medium,
      a setting data including a firmware, an application, license data related to the application, and a setting value,
      a script to execute a plurality of processes related to an installation of the firmware, an installation of the application, a setting of the setting value, and a reactivation of the image forming device in a specified order, and
   an installation software to execute the installation of the firmware, the installation of the application, and the setting of the setting value in accordance with the script;

an installation unit configured to install the installation software acquired from the portable storage medium into the image forming device; and an execution unit configured to execute the installation of the firmware, the installation of the installation software, the setting of the setting value and the reactivation of the image forming device in the specified order described in the script, by using:

the installation software, the firmware, the application, the license data of the application, and the setting value, each of which is included in the setting data acquired from the portable storage medium, and the script which is acquired from the portable storage medium, wherein the execution unit further executes the reactivation of the image forming device after executing at least one of the installation of the firmware, the installation of the application, and the setting of the setting value in accordance with the script, and wherein, after the reactivation of the image forming device, the execution unit further specifies a process to be executed subsequent to the reactivation, and restarts the processing from the specified process.

2. The image forming device according to claim 1, wherein the script includes information specifying each of the plurality of processes.

3. The image forming device according to claim 1, further comprising:

at least one optional function which has been preinstalled in the image forming device and not activated, wherein the setting data includes a license information to activate the optional function, and wherein the plurality of processes executed by the script include a process to activate the optional function.

4. The image forming device according to claim 1, wherein the acquisition unit acquires the setting data, installation data, and the script from the portable storage medium, not from a server via a network.

5. A method for controlling an image forming device capable of connecting with a portable storage medium, the method comprising:

connecting with the portable storage medium, and acquiring, from the portable storage medium, a setting data including a firmware, an application, license data related to the application, and a setting value, and a script to execute a plurality of processes related to an installation of the firmware, an installation of the application, a setting of the setting value, and a reactivation of the image forming device in a specified order, and an installation software to execute the installation of the firmware, the installation of the application, and the setting of the setting value in accordance with the script;

installing the installation software acquired from the portable storage medium into the image forming device; and executing the installation of the firmware, the installation of the installation software, the setting of the setting value and the reactivation of the image forming device in an order described in the script, by using:

the installation software, the firmware, the application, the license data of the application, and the setting value, each of which is included in the setting data acquired from the portable storage medium, and the script which is acquired from the portable storage medium, wherein the reactivation of the image forming device is further executed after executing at least one of the installation of the firmware, the installation of the application, and the setting of the setting value in accordance with the script, and wherein, after the reactivation of the image forming device, the method further comprises specifying a process to be executed subsequent to the reactivation, and restarting the processing from the specified process.

6. The method for controlling the image forming device according to claim 5, wherein the script includes information specifying each of the plurality of processes.

7. The method for controlling the image forming device according to claim 5, wherein:

the image forming device comprises at least one optional function which is preinstalled in the image forming device and not activated, the setting data includes a license information to activate the optional function, and the plurality of processes executed by the script include a process to activate the optional function.

8. The method for controlling the image forming device according to claim 5, wherein the setting data, installation data and the script are acquired from the portable storage medium, not from a server via a network.

* * * * *